United States Patent
Arancibia Reyes

(10) Patent No.: US 12,472,700 B2
(45) Date of Patent: Nov. 18, 2025

(54) SYSTEM ENABLING THE CONTINUOUS AUTOMATED MANUFACTURE AND/OR PRODUCTION OF AT LEAST ONE FILM, COVER, BLANKET AND/OR MESH INTEGRATEDLY COMPRISING AT LEAST ONE FLUID DISTRIBUTION LINE

(71) Applicants: AVANZA INVERSIONES SPA, Santiago (CL); ANAREP SPA, Santiago (CL)

(72) Inventor: Alexis Marcelo Arancibia Reyes, Santiago (CL)

(73) Assignee: WATER SAVE TECHNOLOGY SPA, Santiago (CL)

( * ) Notice: Subject to any disclaimer, the term of this patent is extended or adjusted under 35 U.S.C. 154(b) by 36 days.

(21) Appl. No.: 18/555,678

(22) PCT Filed: Apr. 21, 2022

(86) PCT No.: PCT/CL2022/050037
§ 371 (c)(1),
(2) Date: Oct. 16, 2023

(87) PCT Pub. No.: WO2022/221967
PCT Pub. Date: Oct. 27, 2022

(65) Prior Publication Data
US 2024/0336015 A1   Oct. 10, 2024

(30) Foreign Application Priority Data
Apr. 21, 2021 (CL) .................................. 1003-2021

(51) Int. Cl.
*B29C 65/78* (2006.01)
*A01G 13/33* (2025.01)
(Continued)

(52) U.S. Cl.
CPC .......... *B29C 65/7894* (2013.01); *A01G 13/33* (2025.01); *A01G 25/02* (2013.01);
(Continued)

(58) Field of Classification Search
CPC ..... B32B 2410/00; B32B 27/32; B32B 3/266; B29L 2031/70; B29L 2007/008;
(Continued)

(56) References Cited

U.S. PATENT DOCUMENTS 3,945,873 A   3/1976   Osborn
4,065,926 A   1/1978   Brandt
(Continued)

FOREIGN PATENT DOCUMENTS

DE   4408556   9/1994
EP   1430770   6/2004
(Continued)

*Primary Examiner* — Vishal I Patel
(74) *Attorney, Agent, or Firm* — FisherBroyles, LLP; Jason P. Mueller

(57) ABSTRACT

The present invention relates to a system that allows the manufacturing and/or continuous automated production of at least one film, cover, mantle and/or mesh made of polyethylene, plastic material, among other materials, which comprises in an integrated manner at least one fluid distribution line, so that the manufactured product allows to deploy both component simultaneously, without the need to be deployed on a field separately, which comprises at least one device for continuous and automatic feeding of the film, layer, mat and/or cover made of polyethylene and/or plastic (2), at least one device for continuous and automatic feeding of at least one element for delivery, distribution and/or removal of fluid (3), preferably at least one irrigation line, at least one automatic and continuous feeding device of at least one sleeve (4), at least one thermofusion device (5), and at least one control system.

19 Claims, 11 Drawing Sheets

(51) Int. Cl.
  *A01G 25/02*  (2006.01)
  *B29C 65/02*  (2006.01)
  *B29C 65/20*  (2006.01)
  *B32B 3/26*  (2006.01)
  *B32B 27/32*  (2006.01)
  *B29L 7/00*  (2006.01)
  *B29L 31/00*  (2006.01)

(52) U.S. Cl.
  CPC ............... *B29C 65/02* (2013.01); *B29C 65/20* (2013.01); *B32B 3/266* (2013.01); *B32B 27/32* (2013.01); *B29L 2007/008* (2013.01); *B29L 2031/70* (2013.01); *B32B 2410/00* (2013.01)

(58) Field of Classification Search
  CPC ..... B29C 65/20; B29C 65/02; B29C 65/7894; A01G 13/33
  See application file for complete search history.

(56) References Cited

U.S. PATENT DOCUMENTS

| | | |
|---|---|---|
| 6,293,477 B1 | 9/2001 | Chambers |
| 2007/0144065 A1* | 6/2007 | Lowe ..................... A01G 25/06 47/21.1 |

FOREIGN PATENT DOCUMENTS

| | | | |
|---|---|---|---|
| EP | 1430770 A1 * | 6/2004 | ............ A01G 13/32 |
| JP | S5440140 | 3/1979 | |
| JP | S5440142 | 3/1979 | |
| KR | 102156566 | 9/2020 | |
| KR | 102162295 | 10/2020 | |

* cited by examiner

SYSTEM ENABLING THE CONTINUOUS AUTOMATED MANUFACTURE AND/OR PRODUCTION OF AT LEAST ONE FILM, COVER, BLANKET AND/OR MESH INTEGRATEDLY COMPRISING AT LEAST ONE FLUID DISTRIBUTION LINE

CROSS REFERENCE

This application is a national stage entry application under 35 U.S.C. 371 of PCT Patent Application No. PCT/CL2022/050037, filed Apr. 21, 2022, which claims priority to Chilean Patent Application No. 1003-2021 filed Apr. 21, 2021, the entire contents of each of which are incorporated herein by reference.

FIELD OF THE INVENTION

The present invention refers to a system that allows the automated continuous manufacture and/or production of at least one film, cover, mat and/or mesh made of polyethylene, plastic material, among other materials, which comprises at least one integrated line for fluid distribution, so that the manufactured product allows both components to be deployed at the same time, without the need to be deployed separately on the ground. Preferably, the invention refers to a system that allows the integrated continuous formation of at least one film, mat, cover and/or mesh with at least one drip irrigation line, to be used in the mining industry, such as to cover leaching piles and/or in the agriculture industry to cover cultivated areas.

BACKGROUND OF THE INVENTION

At present, in the technique, films or covers of the surface to be leached have been used, which are arranged on top of the mesh for irrigation, in order to cover the upper surface of the leaching pile with said cover and thus preventing evaporation of the leaching solution, as well as increasing the temperature of the leaching pile increasing the conditions for the proliferation of bacteria in bio-leaching procedures. Notwithstanding the foregoing, these solutions have conferred a great advantage when managing the evaporation parameters of the leaching solution decreasing the rate of water use and leaching agents, as well as increasing the temperature of the leaching pile, the operation of arranging said films on the upper surface of the leaching pile is very labor intensive, as well as the time required for their arrangement and fixation, so that said film or covers of the leaching pile surface are not affected or dragged by the wind action.

Another field in which land surface covers are used is in the agriculture area, where the relationship between plastics and agriculture is so close that it has given rise to praticulture or agro-plasticulture, which involves the use of polymers in the agricultural production, through padding of soils, irrigation system, meshes, tunnels, greenhouse and/or covers, which allow early harvests, growing fruits out of season, weeds and insects control, as well as improving efficiency in use of water, in the use of fertilizers and in the use of the soil itself. The use of paddings or mats to cover the soil surface in agricultural production is a procedure and production system that is increasing worldwide. Traditionally, these mats are formed by a film, where at every certain distance both between rows and on the rows, a hole is made to leave a free space on the covered surface on which said mat is arranged, in such a way that in said space a plant or a tree is cultivated, and where a series of irrigation pipes are also arranged on or under the mat, where the sprinklers or drippers match with the hole made in the mat wherein the plant is cultivated. An inert substrate is generally placed between rows, as a means of supporting the mat against the surface on which it is placed.

Another field in which land surface covers are used is in the area of household and/or industrial waste management, such as sanitary landfills, where nowadays the world trend is to manage sanitary landfills efficiently and ecologically avoiding the leaching flows produced by waste decomposition, to contaminate the underground layers, as well as the methane or gas produced by waste decomposition collected in piles can be used for the generation of energy. For the implementation of said sanitary landfills, it is necessary to provide a series of impermeable and/or permeable membranes for the handling of the different leached fluids, as well as to be able to also provide resistance to the piles, as well as being equipped with a series of piping in order to add and/or remove air or gas from the batteries, as well as to add and/or remove fluid from the batteries, such as water. Leachates, solutions, among others.

Surface covers as defined and used in the mining area, as well as in agriculture and/or in the management of sanitary and industrial landfills have the shortcoming that they require a large amount of time and labor to manage to arrange both the delivery, distribution and/or removal of fluid system, such as the covers on the surface to be covered which implies an operation that, although it is true, provides a system that allows regulating the conditions of the cover surface, such as evaporation, temperature, humidity, weed control, gas control, air control, fluid removal, among others, however its implementation is expensive due to the labor required for its installation as well as the time involved in its implementation, which also adds the time and skilled labor that is required to implement a monitoring and control system of the surface covered by said mat or film.

The processes for melting plastics by temperature used in the art are well known and widely applied in the state of the art, where most of the known equipment fulfills function of joining plastic pieces that are conceptually welded when subjected to temperatures at which the plastic material is fused, that is, welding is a process of joining materials, in which the contact surfaces of two or more parts are melted by applying heat, notwithstanding the foregoing, in the art there is no system or production line that allows the integrated and automatic manufacture of at least one layer, cover, mat and/or film made of polyethylene and/or plastic material whose configuration includes or incorporates in an integrated manner and in a single piece, a fluid delivery, distribution and/or removal system, such as for example at least one irrigation line.

Patent publication ES 2503564 T3 teaches a process for the manufacture of drip irrigation tubes, in which a body is extruded, from which the tube is formed and in the extruded body dosing elements are placed which are attached to the body by means of ultrasonic welding and in these drip irrigation pipes, the water passes from its inner side to the dosing elements through inlet holes, circulates through these dosing elements and exits the irrigation pipes in a metered manner through outlet holes. It comprises that the body is formed as a flattened tubular body and the dosing elements are located in a central zone inside this flattened tubular body and because the flat tubular body is guided between a sonotrode, and an anvil of an ultrasonic welding device and the metering elements are welded to the wall of the tubular body.

Patent publication EP 1430770 A1 teaches a method for manufacturing a combination of mat and at least one irrigation hose, consisting of a flattened tubular tape, which adheres to the film that forms the mat on the side that adheres to the soil where it will be applied. It comprises the following steps, a) extruding a sheet that forms the film that makes up the mat; b) extruding a flattened tubular tape; c) perforating a wall of the tubular tape; d) driving the tubular tape and the film along converging paths in consistent directions and at the same speed until they reach a condition in which said tubular tape contacts the film and inserts, downstream of the first contact area, a member of heat protection inside the tubular tape, the protection member of which is a freely movable plate member having a width less than the tubular tape, so that at least one longitudinal side strip or optionally two opposite longitudinal side strips of said tubular tape remain free; e) maintaining the contact condition and the direction and speed of the harmonized drive of the tubular tape and the film; f) welding the tubular member to the film by heating one or all of the side strips of the tubular tape which are not occupied by the protective member, using heating welders to bring them into contact with said free side strips of the tubular tape.

Patent publication U.S. Pat. No. 9,883,640 describes a method and apparatus for transporting or supplying elastomeric emitters and inserting elastomeric emitters into a drip line to manufacture the same and form an irrigation assembly or system. In one form, the apparatus comprises a feeder, a conveyor, an emitter drive mechanism, and a guide bar for insertion into an extruder to attach the elastomeric emitter to an internal surface of the extruded tube. Friction reduction apparatus and methods are also further described.

Patent publication DE3506994 (A1) describes a process for producing flexible liquid permeable films with reflow barrier and films prepared according to the process. According to the publication, the films are formed in a partially protruded manner at closely adjacent points on their surface by plastic stretching and then the stretched film material is divided into at least two segments by cutting in the region of the deformations projecting onto the film plane in one direction. Preferably thermoplastic material is used as the material for the films.

While in the prior art it is possible to visualize systems and methods that, on the one hand, are directed to the manufacture of the mat with the pipes and, on the other hand, it is possible to visualize systems and methods for the manufacture of pipes with the incorporated drippers, it is not possible to deduce or derive from the state of the art a system that makes it possible to obtain, in a single integrated, automatic and continuous production line, a fluid delivery, distribution and/or removal system with at least one layer, cover, mat and/or film made of polyethylene and/or plastic, in a single piece.

The surfaces covered with said mats or films, as well as fluid conduction lines in the different fields of application analyzed above, are large, for which reason it would be desirable to have a system or production line that allows forming and manufacturing a layer, cover, mat and/or film in a continuous and automatic way, whose configuration includes integrated a fluid delivery, distribution and/or removal system integrated in a single piece into the cover, in such a way that when said cover, layer, mat and/or film is deployed and/or arranged, at the same time a fluid delivery, distribution and/or removal system (air, gas, water, solvents) is deployed, arranged and implemented.

SUMMARY OF THE INVENTION

The primary object of the invention is to provide a system or production line that allows the continuously and automatically form and manufacture a layer, cover, mat and/or film, whose configuration includes in a single piece and in an integrated, attached and/or fixed manner, a fluid delivery, distribution and/or removal system incorporated into the cover, so that when said cover, layer, mat and/or film is deployed and/or arranged, at the same time a fluid delivery, distribution and/or removal system is deployed, arranged and implemented.

The present invention provides an automatic, integrated and continuous system (1) for the production and manufacture in a single piece of at least one layer, cover, mat and/or film made of polyethylene and/or plastic material attached, fixed and/or integrated with at least one element for the delivery, distribution and/or removal of fluid, comprising at least one device for continuous and automatic feeding of the film, layer, mat and/or cover made of polyethylene and/or plastic (2), at least one continuous and automatic feeding device of at least one element for delivery, distribution and/or removal of fluid (3), such as preferably at least one irrigation line, at least one continuous and automatic feeding device of at least one sleeve (4), at least one thermofusion device (5), and at least one control system.

BRIEF DESCRIPTION OF THE FIGURES

In order to help a better understanding of the characteristics of the invention, according to a preferred example of its practical implementation, a set of drawings is attached as an integral part of the description, wherein the invention has been represented with an illustrative and non-limiting nature.

PREFERRED EMBODIMENT OF THE INVENTION

Figure 1:
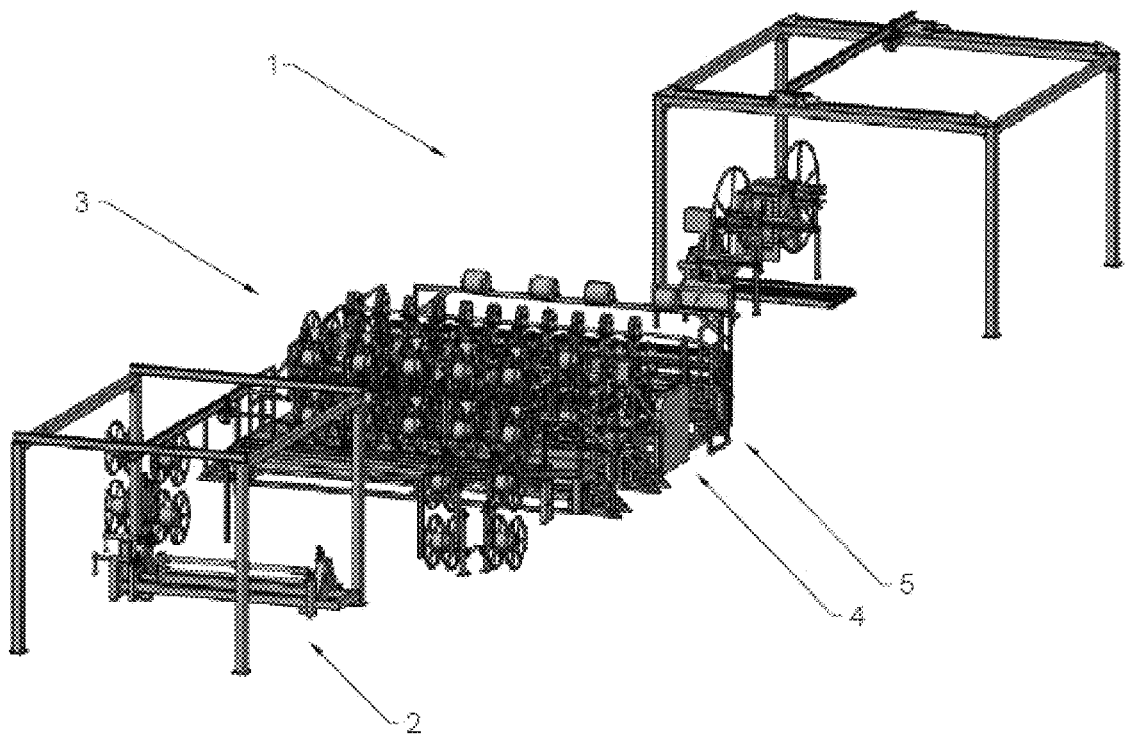
FIG. 1 corresponds to a top side perspective view of a system of the present invention.

An automatic, integrated and continuous system (1) for the production and manufacture in a single piece of at least one layer, cover, mat and/or film made of polyethylene and/or plastic material, attached, fixed and/or integrated with at least one element for the delivery, distribution and/or removal of fluid, as generally observed in FIG. 1, comprises at least one device for continuous and automatic feeding of the film, layer, mat and/or cover made of polyethylene and/or plastic (2), at least one device for continuous and automatic feeding of at least one element for delivery, distribution and/or removal of fluid (3), such as preferably at least one irrigation line, at least one continuous and automatic feeding device of at least one sleeve (4), at least one thermofusion device (5), and at least one control system.

Figure 2:
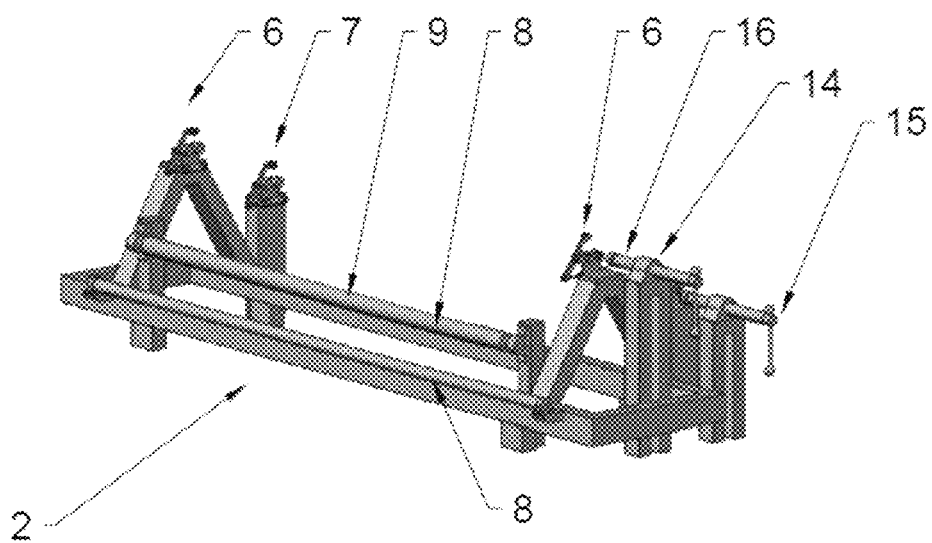
FIG. 2 corresponds to a perspective view of a film feeding device of the present invention system.
Figure 3:
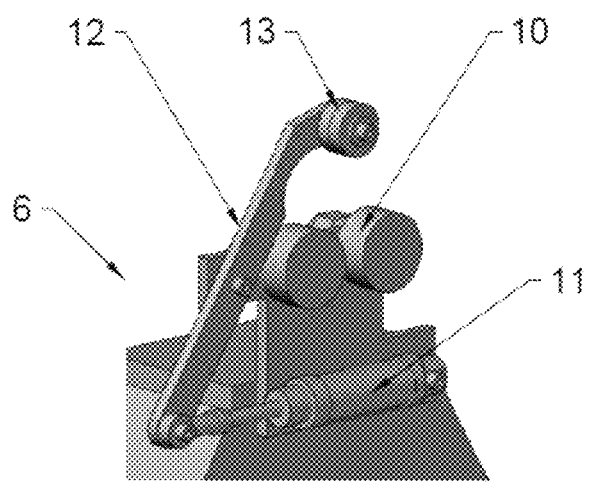
FIG. 3 corresponds to an enlarged perspective view that shows in detail a means or element that comprises a film feeding device of the present invention system.
Figure 4:
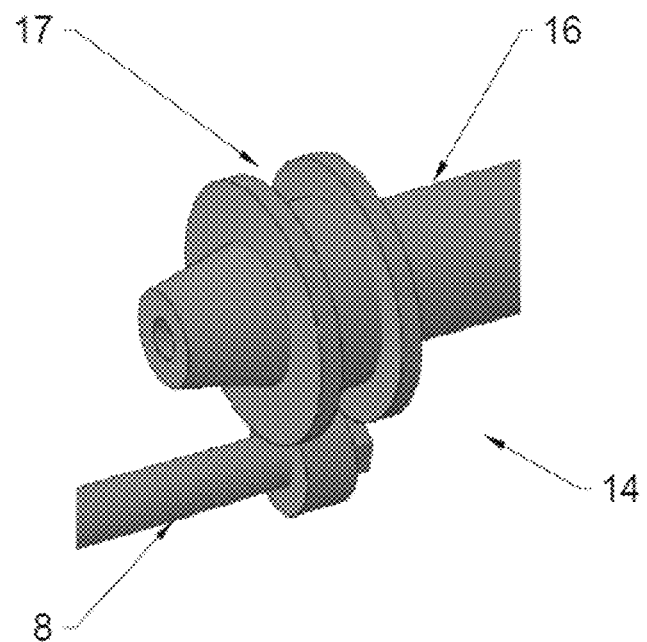
FIG. 4 corresponds to an enlarged perspective view that shows in detail another means or element that comprises a film feeding device of the present invention system.

The device for continuous and automatic feeding of the film, layer, mat and/or cover made of polyethylene and/or plastic (2) is illustrated in FIG. 2, it comprises at least one upper axis support (6) and at least one lower support axis (7), at least one support axis (8) of at least one roll of film, layer, mat and/or cover made of polyethylene and/or plastic that has at least one idler (9) of free rotation where said roll is mounted, and where said support axis (8) with the mounted roll is subsequently positioned in at least one bearing (10), which is preferably of the Cam Fallower type, as illustrated in FIG. 3, comprising the at least one axis support (6, 7), and where to press the support axis (8) against the bearing (10) and not come out of its position, a hydraulic cylinder (11) is actuated which lowers an axis clamping arm (12) so that a bearing (13) presses said axis. In a preferred configuration, said feeding device (2) also comprises a means (14) to carry out axial movements of the roll, which in a preferred form comprises a handle (15) that moves a thread (16) that has one end with a hook (17) that allows it to be coupled to the support axis (8) to make smooth movements to the support axis (8) to correct imperfections in the winding of the film, layer, mat and/or cover made of polyethylene and/or plastic that is being fed into the system (FIGS. 2, 3, 4).

In operation, once the rolls are assembled in the feeding device (2), the film, layer, mat and/or cover made of polyethylene and/or plastic is positioned in at least one structure (17) that opens it in a width depending on the predetermined union matrix of the at least one element for delivery, distribution and/or removal of fluid. The film opening structure (17) is designed and manufactured so that when the film is pulled during its feeding into the system, it can be opened to the maximum extent, without major drawbacks (see FIG. 5).

Figure 6:
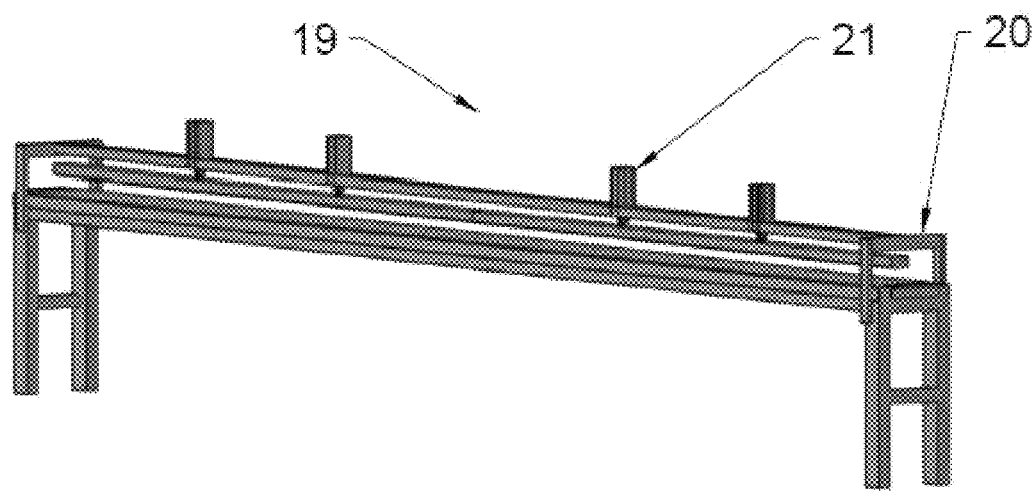
FIG. 6 corresponds to a front perspective view of a film welder of the present invention system.
Figure 7:
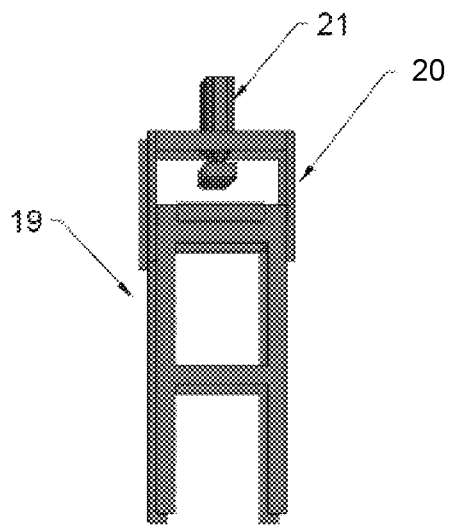
FIG. 7 corresponds to a side view of a film welder of the present invention system.

In a preferred form, the system (1) additionally comprises at least one sensor (18) for activating at least one warning siren for the end of the film, so that the union can be made with at least one other film that is arranged in the feeding device, for which the system (1) of the present invention also comprises a welder or fusion iron (19), which is illustrated in FIGS. 6 and 7. The welder (19), which is the one in charge of fusing the film that is being finished with the film that begins in the process, in such a way that the two ends are joined in the welder (19), the heating of the resistances begins, once heated, a cylinder-bearing structure (20) automatically moves downwards through cylinders (21) which exert sufficient pressure to stick both plastics by the resistance temperature.

Figure 5:
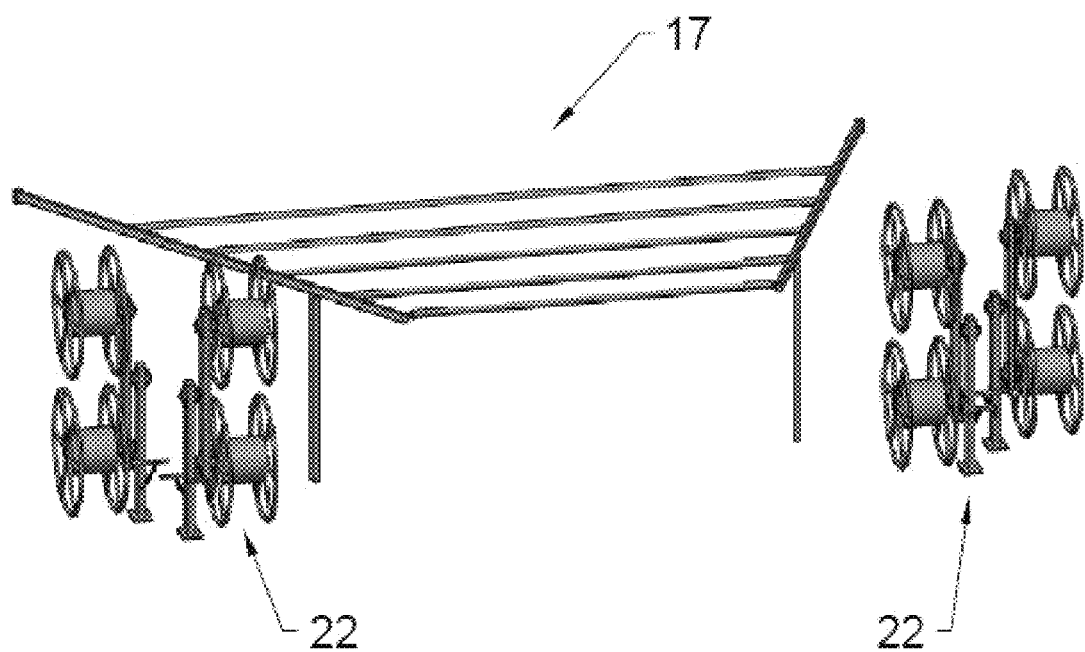
FIG. 5 corresponds to a front perspective view of a means or structure for stretching the film of the present invention system.
Figure 8:
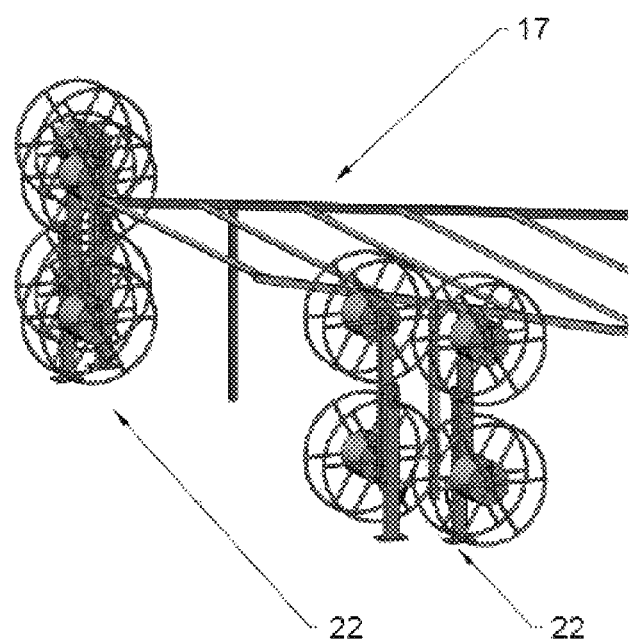
FIG. 8 corresponds to a perspective side view of a means or structure for stretching the film of the present invention system.

As can be seen in FIGS. 5 and 8, the system (1) also comprises at least one carrier of at least one ballast element or means (22) that will be attached to the film, layer, mat and/or cover made of polyethylene and/or plastic where said carrier (22) is preferably arranged at the side and beginning of the opening structure (17), so that the system (1) is fed with at least one ballast element or means to be attached to the film, mat, layer and/or cover, which preferably may be blind hoses or layflat, among other ballast means.

Figure 9:
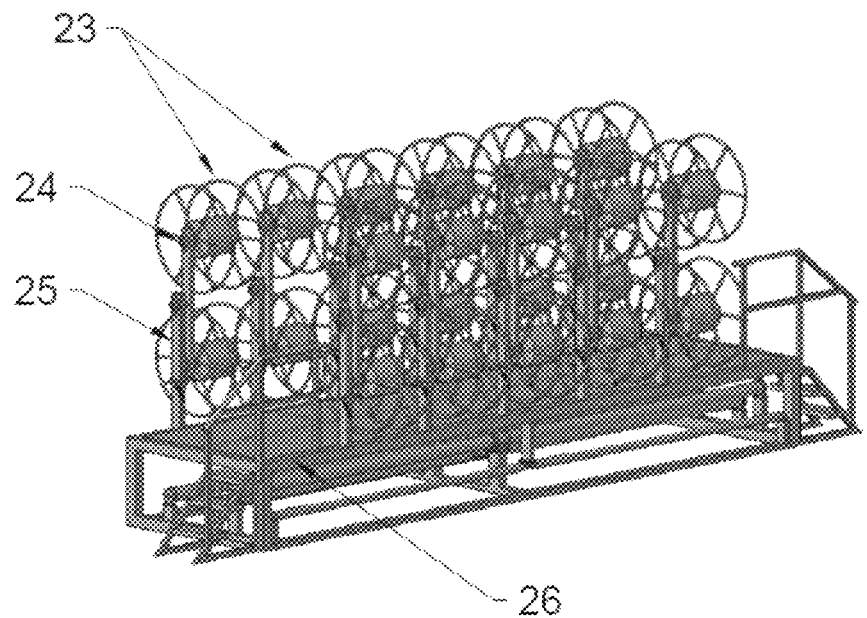
FIG. 9 corresponds to a front perspective view of a feeding device for an irrigation line of the present invention system.
Figure 10:
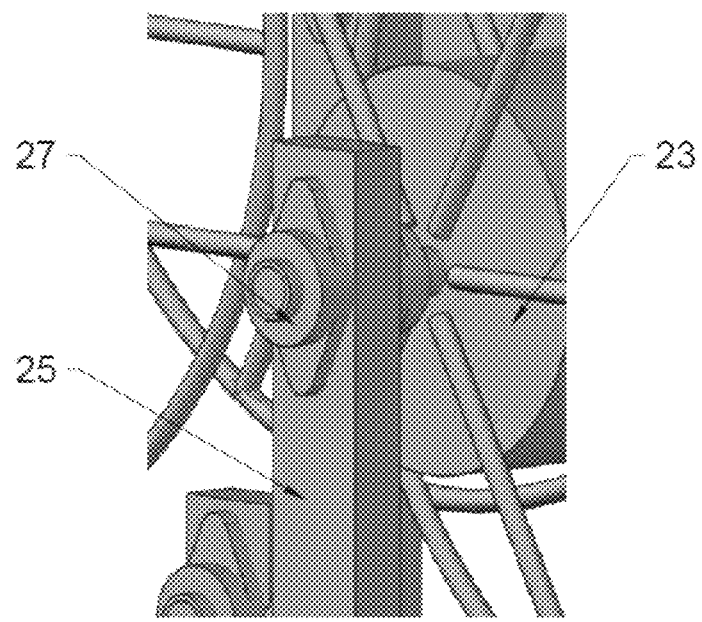
FIG. 10 corresponds to a perspective side view of an enlarged detail of the feeding device element of an irrigation line of the present invention system.

The at least one device for continuous and automatic feeding of at least one element for delivery, distribution and/or removal of fluid (3), such as preferably at least one irrigation line, as illustrated in FIGS. 9 and 10, comprises at least one reel or structure of the irrigation line carrier (23) in which said irrigation line is rolled, where the reel has a rotating central axis (24) fixed to a support (25) that allows it to rotate freely according to the thermofusion speed, where said feeding device preferably comprises a plurality of reels (23) that are fixed to a support platform (26) wherein the supports (25) of the reels are fixed. The continuous and automatic feeding device of at least one element for delivery, distribution and/or removal of fluid (3) has a safety device (27) that is activated once the roll is finished.

The safety device (27) is located in the lower left end of the reel or structure of the irrigation line carrier (23) which is fixed by a spring (28), then the ends of the structure or reel (23) must be fastened and rotated on their axis.

Figure 11:
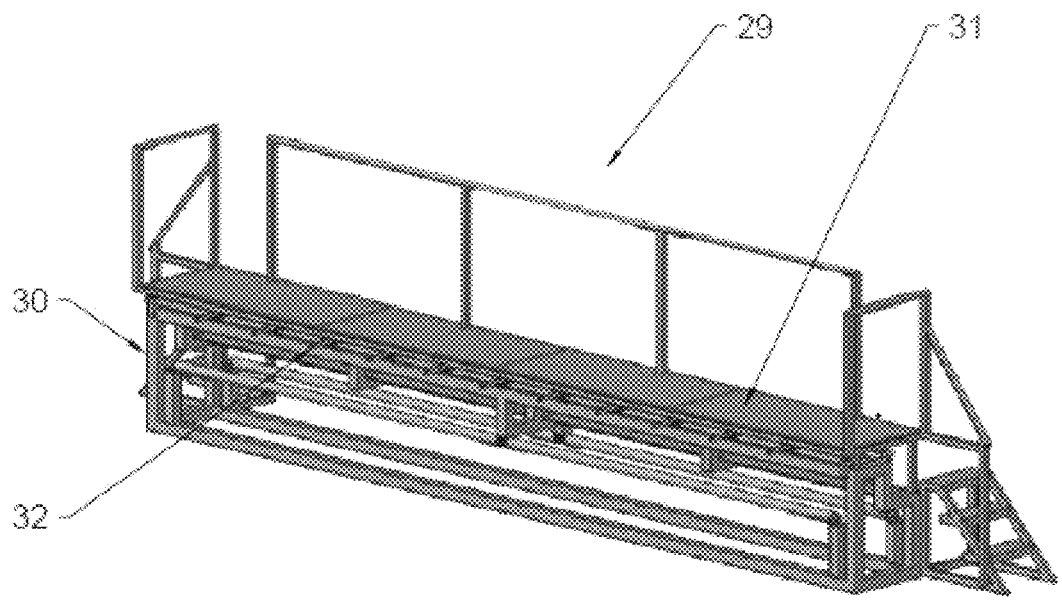
FIG. 11 corresponds to a front perspective view of an operating platform of the present invention system.
Figure 12:
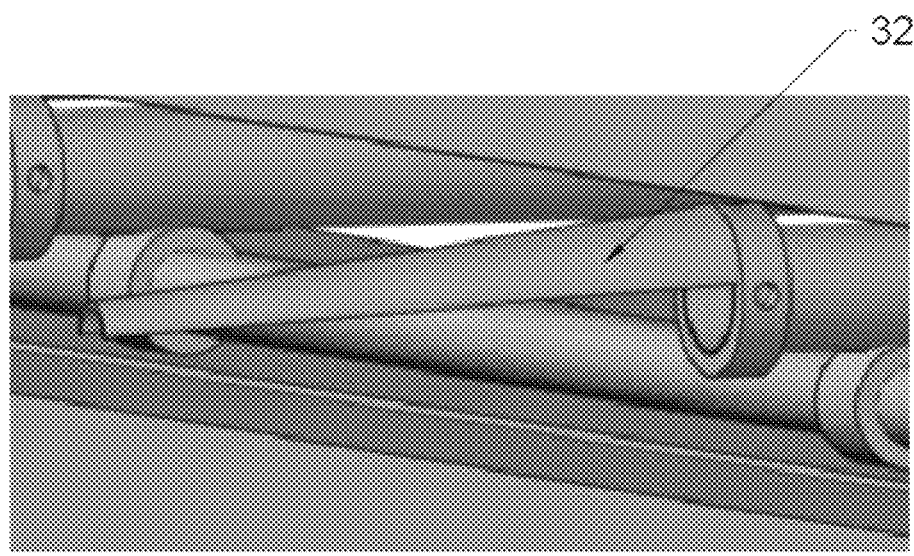
FIG. 12 corresponds to a side front perspective view of an enlarged detail of the operating platform element of the present invention system.

An operating platform (29) as seen in FIG. 11, is located between the at least one device for continuous and automatic feeding of at least one element for delivery, distribution, and/or removal of fluid (3), and at least one thermofusion device (5), which comprises a structure (30) that has a passage (31) allowing the movement of the operators. Under this operating platform (29) there are some tubular guides (32) which are used to give the first measurement in the product matrix, where the irrigation lines are introduced through these guides to prevent them from suffering any damage due to the friction in the structure of the system.

Figure 13:
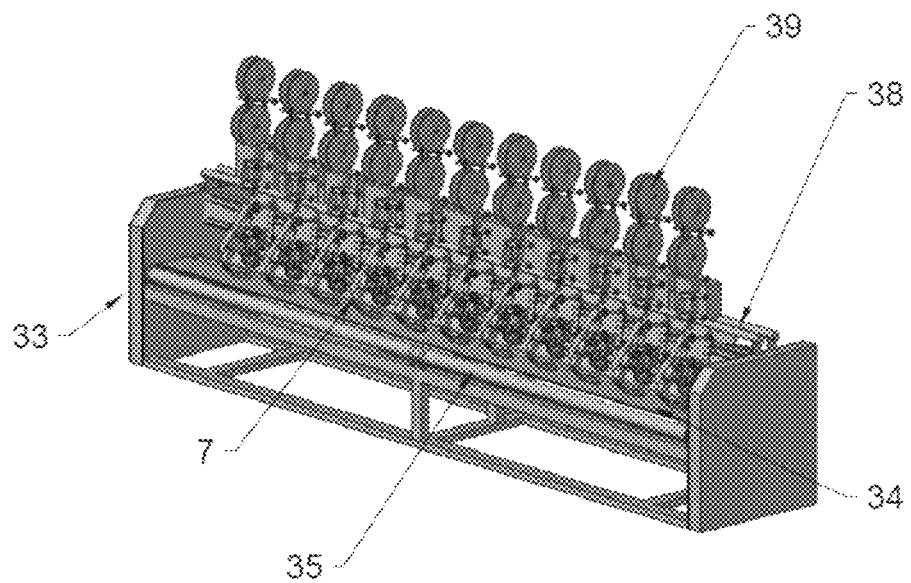
FIG. 13 corresponds to a front perspective view of a thermofusion device of the present invention system.

A general view of FIG. 13 illustrates at least one thermofusion device (5) that allows two or more polyethylene and/or plastic products to be welded together using hot air, it comprises a base structure (33) with supports that generate a space below a base (34) where there is at least one drag idler (35), where in a preferred configuration it comprises three of said drag idlers (35) through which the film, layer, mat and/or cover made of polyethylene and/or plastic passes deployed to its maximum, where above said drag idlers (35) high temperature silicone wheels (36) (see FIG. 14) are arranged, so that they touch said idlers (35) in such a way that together they become the means of driving the system, in this way the irrigation line is arranged above the film in the area heated by the combination of the idlers and silicone wheels (36) and by activating a hot air injector tube (37)

arranged in said joining area between the film and the irrigation line in the area previously heated by the silicone wheels (36), produces the joining between the film and the irrigation line.

Figure 14:
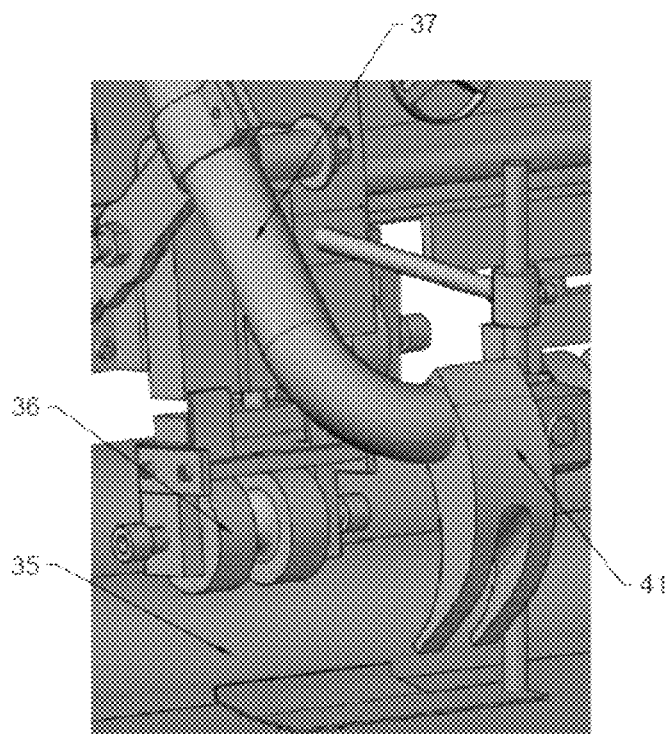
FIG. 14 corresponds to a side front perspective view of a detail of a film welder element of the present invention system.
Figure 15:
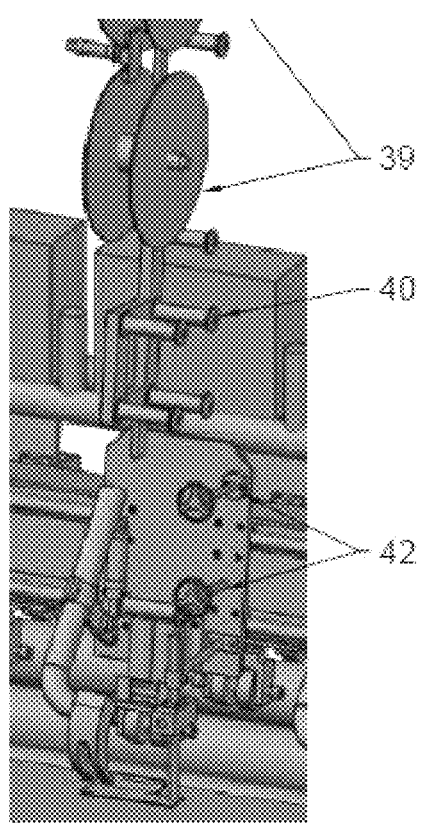
FIG. 15 corresponds to a front perspective view of a detail of a sleeve feeder of a film welder of the present invention system.

In a preferred embodiment of the invention, the at least one thermofusion device (5), as illustrated in FIGS. 13, 14 and 15, comprises a support structure (38) above the base structure (33) comprising at least one film sleeve carrier (39) and sleeve guides (40) in such a way that the film unfolded by said drag idlers (35) is heated by the silicone wheels (36) wherein the irrigation line is arranged and above the film sleeve where the hot air injector tube (37) is actuated, which at its end includes a ceramic heater (41) that causes the joining of the film sleeve and the pressure produced by the silicone wheels (36) weld the two plastics, which due to the fact that the silicone wheels are separated from each other, they prevent the irrigation line from being thermofused with the fused plastics. Preferably, the system has a plurality of bodies or thermofusion units, each one with handles for regulation and movement of the welding matrix (42), as well as a control system.

Figure 16:
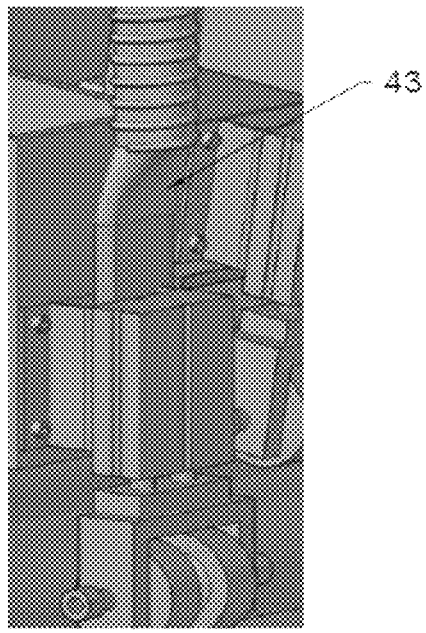
FIG. 16 corresponds to a side perspective view of a cooling element detail of the present invention system.

Once the plastic is fused it needs to be cooled, for this the system also includes a cooling device (43) comprising at least one blower motor connected to air nozzles that perform cooling, which is illustrated in FIG. 16. The air from the blower is room temperature air which is necessary to lower the temperature in plastic.

Figure 17:
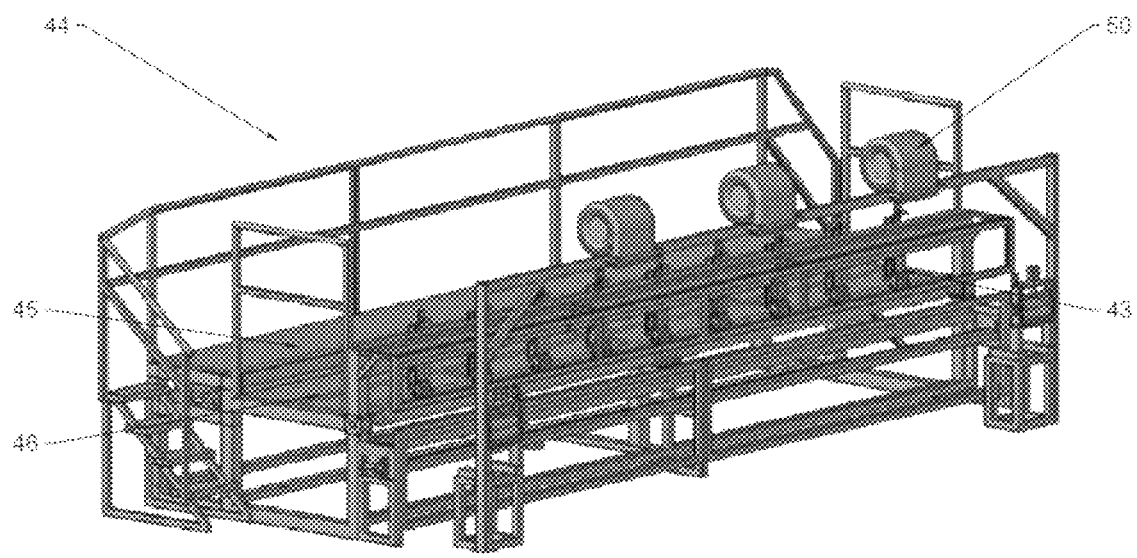
FIG. 17 corresponds to a top side perspective view of a control and cutting table of the present invention system.
Figure 18:
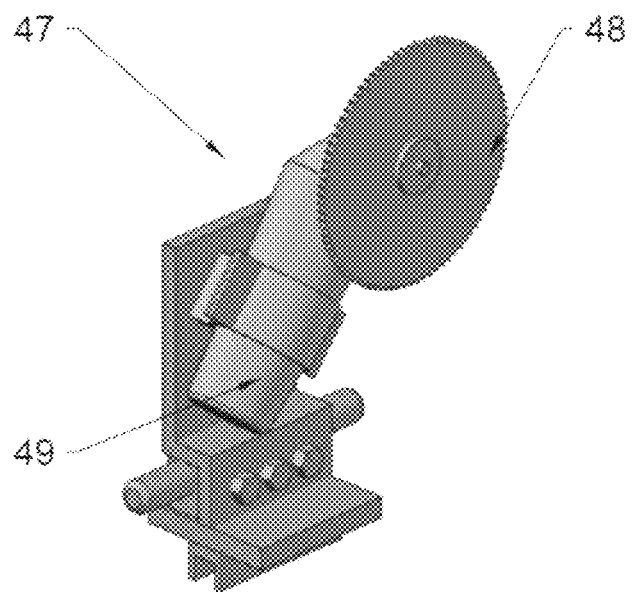
FIG. 18 corresponds to a side perspective view of a cutting tool of the present invention system.

The system (1) also includes at least one quality control and cutting counter (44) which is illustrated in FIG. 17, it comprises a towing device with acrylic wheels (43) and an idler that rotate at thermofusion speed by means of a drive chain, this drag system is to maintain the tension between the cut and the thermofusion machine. In this counter the operators verify that the welding of the plastics is correct and uniform, it is also where they carry out repairs and patches due to imperfections that may occur both in the film and in the drip lines, for this purpose they counts with a transfer platform (45) and a repair platform (46). A cutting device (47) is located after the drive wheels and is made up of a cutting saw (48) and a motor (49) that allow the cutting saw (47) to move from end to end (FIG. 18). Following the cutting saw (47) there is an arch with three blowers (50) which are the second cooling stage to ensure the cooling of the product.

Figure 19:
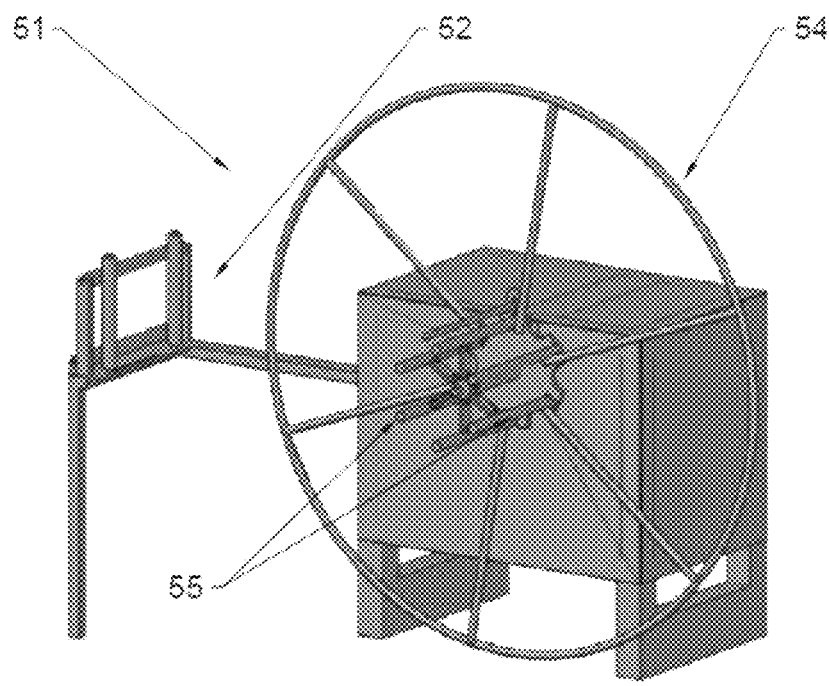
FIGS. 19 and 20 correspond to a side perspective view of rewinder elements of the present invention system.
Figure 20:
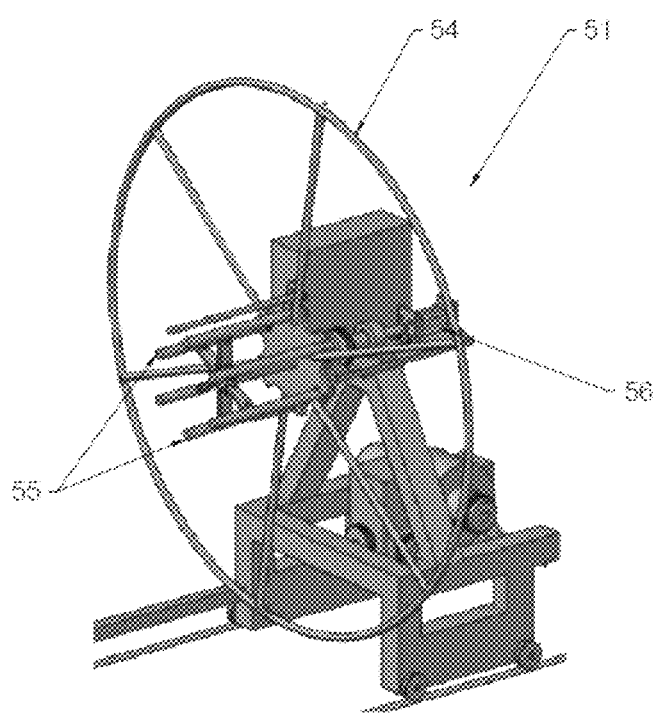
Figure 21:
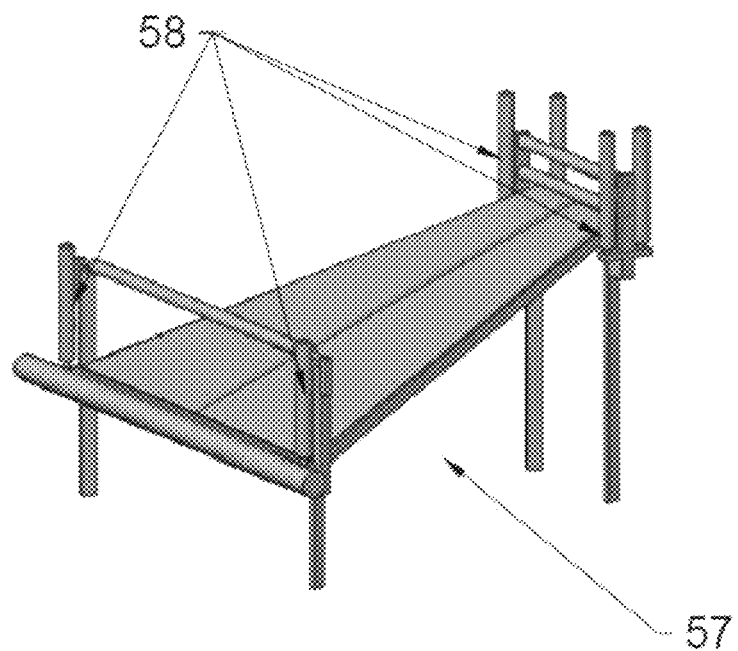
FIG. 21 corresponds to a top side perspective view of a rewinder table of the present invention system.

The system comprises at least one rewinder unit (51) that allows the finished product to be rolled up in donut-type format for packaging. Once rolled up, it is strapped and removed from the equipment. In a preferred embodiment of the invention, the rewinder equipment comprises at least one fixed rewinder (52) and another with lateral displacement (53) which is illustrated in FIGS. 19 and 20. The rewinder (52, 53) includes a circular lateral stop (54), it has a lever to fasten the product at the beginning of the rolling, the product rotates on some guides (55), these guides have the particularity of expanding or contracting through a cylinder actuated by a valve (56), at the beginning of the rolling they must be expanded and once the product is finished they must be contracted to remove the product. At least one rewinder counter (57) is the device in charge of guiding and positioning the thermofused product in the correct direction, this structure has a series of idlers (58) to ensure that the product is not damaged by the friction exerted (FIG. 21).

Figure 22:
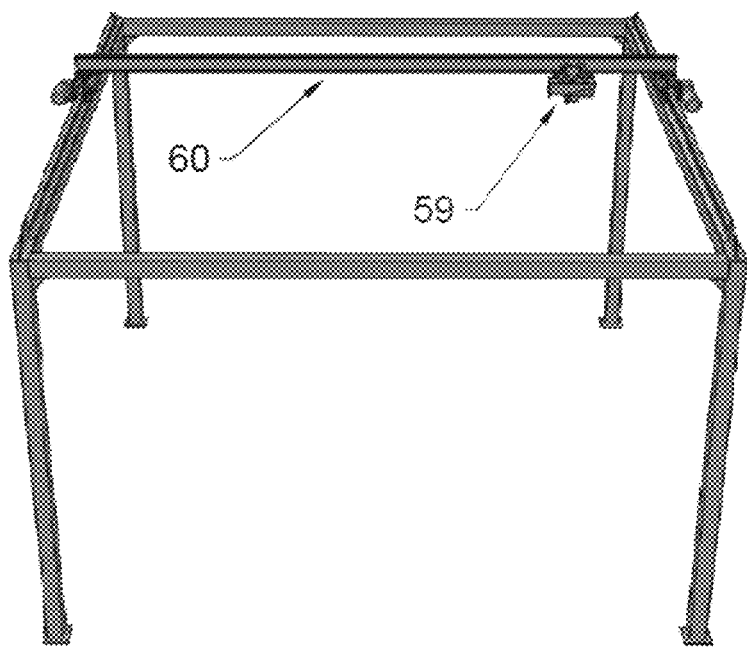
FIG. 22 corresponds to a top front perspective view of a tackle of the present invention system.

The system also comprises tackles (59) of the mobile beam type (60) associated with the film roll carrier and the final product rewinder, which is illustrated in FIG. 22.

Although the form of an automatic, integrated and continuous system for the production and manufacture of at least one layer, cover, mat and/or film made of polyethylene and/or plastic material in a single piece that includes an integrated element for delivery, distribution and/or removal of fluid, described herein constitute a preferred inclusion of this invention, it is to be understood that the invention is not limited to this precise form of the system, and that changes, which are defined in the appended claims, may be made thereto without departing from the scope of the invention.

The invention claimed is:

1. An automatic, integrated and continuous system configured to produce and manufacture at least one film made of polyethylene and/or plastic material in a single piece, the system being configured to attach, fix and/or integrate said at least one film with at least one element for fluid delivery, distribution and/or removal, the system comprising,
    at least one film feeding device configured for continuous and automatic feeding of the at least one film,
    at least one device for continuous and automatic feeding of the at least one element for fluid delivery, distribution and/or removal,
    at least one carrier reel or support structure on which the at least element for fluid delivery, distribution and/or removal is wound, said reel having a rotating central axis fixed to a support that allows free rotation at a thermofusion speed, such that said at least one element for fluid delivery, distribution and/or removal is arranged on a face of the at least one film,
    at least one thermofusion device having a support structure above a base structure,
    at least one sleeve feeding device configured for continuous and automatic feeding of at least one film sleeve, said sleeve feeding device being configured to join the at least one element for the fluid delivery, distribution and/or removal with said at least one film,
    wherein the at least one thermofusion device comprises at least one film sleeve carrier and film sleeve guides, such that the at least one element for fluid delivery, distribution and/or removal is placed on the unfolded film, and the film sleeve is arranged above said element for fluid delivery, distribution and/or removal, and
    wherein a hot air injector tube is activated, said tube having, at its end a cermic heater that joins the at least one film sleeve to said at least one film.

2. The system according to claim 1, wherein the at least one film feeding device comprises at least one upper axis support, at least one support axis for at least one roll of the film, the support axis comprising at least one idler of allowing free rotation of the roll, wherein said at least one support axis with the mounted roll is subsequently positioned in at least one bearing.

3. The system according to claim 2, wherein the at least one film feeding device further comprises at least one lower axis support.

4. The system according to claim 3, wherein the at least one upper and/or lower axis support further comprises a hydraulic cylinder configured to lower an axis clamping arm, such that a bearing presses the support axis in place to present displacement during operation.

5. The system according to claim 1, wherein the at least one film feeding device further comprises a mechanism for axial movement of the roll, the mechanism comprising a handle that actuates a threaded element having a hook at one end, the hook being configured to engage the support axis and enable controlled axial adjustments to correct irregularities during feeding of the film.

6. The system according to claim 1, wherein it also comprises a film opening structure, the opening structure being configured to progressively unfold the at least one film during its feeding into the system, so as to ensure full extension along its width.

7. The system according to claim 1, further comprising at least one sensor configured to activate at least one end-of-film warning siren, the system being arranged to allow the joining of a new film to replace the one that is sending in the film feeding device.

8. The system according to claim 1, further comprising a welding or fusion device configured to join the trailing edge of an outgoing film with the leading edge of a new film being fed into the system.

9. The system according to claim 1, further comprising at least one operating platform positioned between the at least one device for continuous and automatic feeding of the at least one element for delivery, distribution and/or removal of fluid, and the at least one thermofusion device, the operating platform including a support structure with a passage underneath in which tubular guides are arranged, said tubular guides being configured to receive the at least one element for fluid delivery, distribution and/or removal.

10. The system according to claim 1, wherein the at least one thermofusion device comprises a base structure supported above a lower surface, defining a space in which at least one drag idler is positioned, the at least one drag idler being configured to guide the at least one film in a fully deployed state, where above the at least one drag idler high temperature silicone wheels are arranged such that the wheels make contact with the at least one drag idler to jointly drive the movement of the at least one film, and wherein the at least one element for fluid delivery, distribution and/or removal is positioned above the at least one film in a zone heated by the interaction between the at least one drag idler and the silicone wheels, and wherein the hot air injector tube is activated to apply additional heat in a joining area to enable thermofusion between the at least one film and the at least one element for fluid delivery, distribution and/or removal.

11. The system according to claim 10, wherein the system comprises a plurality of thermofusion devices, each comnprising handles for regulating and displacing of the joint formed by thermofusionm, and a control system.

12. The system according to claim 1, further comprising at least one carrier of at least one ballast element configured to be attached to the at least one film, wherein the at least one ballast element comprises blind hoses or layflat.

13. The system according to claim 1, further comprising a cooling device including at least one blower motor connected to air nozzles configured to cool thermofused joints.

14. The system according to claim 1, further comprising at least one quality control and cutting counter having that includes a drive device with acrylic wheels and at least one idler rotating at thermofusion speed by means of a drive chain, and a transfer platform and a repair platform; for repairing possible defects from thermofusion, and at least one cutting device for transverse cutting of a finished product, located after the acrylic wheels, the cutting device comprising a cutting saw and a motor configured to move the cutting saw aross the finished product, and at least one arch with blowers positioned above the finished product, said blowers being configured to cool the finished product.

15. The system according to claim 1, further comprising at least one rewinder device configured to wind a finished product.

16. The system according to claim 15, further comprising at least one rewinder without lateral displacement and another with lateral displacement.

17. The system according to claim 16, wherein the at least one rewinder comprises a circular lateral stop and guides for winding the finished product the guides being expandable and contractible by means of a cylinder actuated by a valve, such that the guides are expanded at the beginning of the winding and contracted upon completion to allow removal of the finished product.

18. The system according to claim 1, further comprising at least one rewinder counter configured to guide and position a finished product in its winding direction, the rewinder counter including a series of idlers.

19. The system according to claim 1, further comprising tackles arranged on a mobile beam.

* * * * *